FIG. 1.

WHEAT FLOUR, 17 PARTS, DRY EGG ALBUMIN, 30 PARTS, SUGAR, 25 PARTS, MIXED AND BLENDED TO A UNIFORM MIXTURE

↓

MELTED OR LIQUID SHORTENING, 30 PARTS, ADDED GRADUALLY AND THE MIXTURE BLENDED UNTIL IT IS UNIFORM

↓

SEPARATELY BLENDED MIXTURE OF EGG WHITE, 12 PARTS, SALT, 0.75 PART, VANILLA EXTRACT, 0.25 PART, ADDED TO THE MIXTURE AND THE WHOLE BLENDED TO A UNIFORM STREUSEL-LIKE MIXTURE

↓

MIXTURE BAKED AT USUAL BAKING TEMPERATURE RANGE

↓

BAKED MIXTURE COMPRESSED AT APPROXIMATELY 2000 P.S.I. TO FORM A COMPACT, EASILY HANDLED EDIBLE BAR FREE FROM FAT ON EXTERIOR

*INVENTOR*
*Joseph Cryns.*
BY
*W. J. Eccleston*
ATTORNEY

Fig. 2.

WHEAT FLOUR, 15 PARTS, DRY EGG ALBUMIN, 2.8 PARTS, SUGAR, 2.6 PARTS, MIXED AND BLENDED TO A UNIFORM MIXTURE.

↓

MELTED OR LIQUID SHORTENING, 30 PARTS, ADDED GRADUALLY AND THE MIXTURE BLENDED UNTIL IT IS UNIFORM

↓

SEPARATELY BLENDED MIXTURE OF 14 PARTS OF WHOLE EGGS, 0.75 PART OF SALT, AND 0.75 PART OF BAKING POWDER ADDED TO THE MIXTURE AND THE WHOLE BLENDED TO A UNIFORM STREUSEL-LIKE MIXTURE

↓

MIXTURE BAKED AT USUAL BAKING TEMPERATURE RANGE

↓

BAKED MIXTURE COMPRESSED AT APPROXIMATELY 2000 P.S.I. TO FORM A COMPACT EASILY HANDLED BAR FREE FROM FAT ON EXTERIOR

INVENTOR
Joseph Cryns.
BY W. J. Eccleston,
ATTORNEY

Fig. 3.

WHEAT FLOUR, 25 PARTS, DRY EGG ALBUMIN, 15 PARTS, DEHYDRATED WHOLE EGGS, 15 PARTS, SUGAR, 20 PARTS, MIXED AND BLENDED TO A UNIFORM MIXTURE.

↓

MELTED OR LIQUID SHORTENING 21.5 PARTS, ADDED GRADUALLY AND THE MIXTURE BLENDED UNTIL IT IS UNIFORM

↓

SEPARATELY BLENDED MIXTURE OF 18 PARTS OF WHOLE EGGS, 1 PART OF SALT, AND 1 PART OF BAKING POWDER ADDED TO THE MIXTURE AND THE WHOLE BLENDED TO A UNIFORM STREUSEL-LIKE MIXTURE

↓

MIXTURE BAKED AT USUAL BAKING TEMPERATURE RANGE

↓

BAKED MIXTURE COMPRESSED AT APPROXIMATELY 2000 P.S.I. TO FORM A COMPACT, EASILY HANDLED BAR FREE FROM FAT ON EXTERIOR

INVENTOR
Joseph Cryns.
BY
W. J. Eccleston
ATTORNEY

United States Patent Office 2,738,277
Patented Mar. 13, 1956

2,738,277
METHOD OF MAKING COMPRESSED CEREAL BARS FOR EMERGENCY RATIONS AND THE RESULTING PRODUCT

Joseph Cryns, Chicago, Ill., assignor to the United States of America as represented by the Secretary of the Army Application April 30, 1953, Serial No. 352,316

6 Claims. (Cl. 99—83)

(Granted under Title 35, U. S. Code (1952), sec. 266)

The invention described herein, if patented, may be manufactured and used by or for the Government for governmental purposes without the payment to me of any royalty thereon.

This invention relates to compressed cereal bars designed for use as emergency rations by soldiers, shipwrecked sailors or airplane personnel, also explorers, mountain-climbers, and others who are likely to be exposed to the weather for extended periods but cannot prepare or carry meals for one reason or another, hence must subsist on survival bars, as they are sometimes called.

General objects of the invention are to provide a survival bar which can be munched or sucked like zwieback, which is palatable, nutritious, provides a balanced ration, is highly concentrated and easily prepared, and contains only ingredients which may be procured in practically unlimited quantities. A further object is to provide a survival bar which keeps well in all climates. A still further object is to provide a survival bar whose composition can be varied to some extent to suit the nutritional requirements of human beings in different climates. A specific object is to provide a survival bar which in the preferred form contains a considerable proportion of sugar (10–23%), 18 to 40% fat or shortening, about 9–50% proteinaceous material, and the balance (13–50%) flour, with salt and flavoring as preferred.

A survival bar which contains as little as 13% by weight of wheat flour and nearly twice as much shortening, has been considered impossible, because there is not enough wheat flour present to bind the fat during machining and baking. However, by my process all the ingredients are perfectly blended and the fats stays in the bar even when exposed to temperatures as high as 150° F. for four hours.

In the accompanying drawings forming part of this specification, three slightly different procedures within the scope of the invention are set forth in flow sheets, designated respectively Figs. 1, 2 and 3. All parts mentioned in this specification are parts by weight.

In the first step of the preferred procedure (Fig. 1) wheat flour, 17 parts, dry egg albumin, 30 parts, and sugar (sucrose) 25 parts are blended in a blending machine until the mixture is uniform. Then while the machine is still running, shortening (30 parts) in liquid form is poured slowly in, and blending continues until the mixture is again uniform to all appearance. While this mixing has proceeded, a second mixer has blended 12 parts of egg white, 0.75 part of salt (NaCl) and extract of vanilla, 0.25 part; this second mixture is poured into the first mixture when the latter is completely blended and homogeneous. The final mixing continues until a uniform granulation is obtained, like a streusel topping. The product is baked in that form and then compressed into bars at high pressure (preferably about 1500–3000 pounds per square inch, e. g., 2000 p. s. i.). A hydraulic press is convenient for this step of the procedure.

To recapitulate: the preferred compressed cereals or survival bar is made of the following ingredients:

*Fig. 1 summarized*

|  | Parts by Weight (including moisture) | Percent |
|---|---|---|
| Wheat Flour | 17 | 14.8 |
| Sugar | 25 | 21.7 |
| Dry Egg Albumin | 30 | 26.1 |
| Shortening | 30 | 26.1 |
| Egg White | 12 | 10.4 |
| Salt and Flavoring | 1 | 0.9 |
| Totals | 115 | 100.0 |

In the preferred bar, the shortening used is hydrogenated cottonseed oil, melted prior to the second mixing step. Other edible fats of vegetable or animal origin might be used, for example, other hydrogenated fats, butter, lard, and melted animal fat such as bacon grease, suet, etc., also blends or mixtures of these fats. In lieu of commercial or white wheat flour, so-called whole wheat flour, graham flour, rice flour, potato flour, finely ground cornmeal or oatmeal, or any of the flour mixtures such as are required by Government regulations in wartime, may be employed. Obviously, flavoring materials other than, or in addition to, vanilla extract may be used to enhance the palatability of the product for some tastes.

Figs. 2 and 3 disclose similar procedures for making survival bars each of which differs from the bar previously described principally in the use of whole eggs from the shell, with salt for the only flavoring other than sugar. Furthermore, in the procedure of Fig. 2, only 15 parts of flour are used, with twice as much shortening as flour; while according to Fig. 3, the flour-shortening ratio is 25:21.5.

*Fig. 2 summarized*

|  | Parts by Weight (including moisture) | Percent |
|---|---|---|
| Wheat Flour | 15.0 | 13.1 |
| Sugar | 26.0 | 22.7 |
| Dry Egg Albumin | 28.0 | 24.5 |
| Shortening | 30.0 | 26.2 |
| Shell Eggs | 14.0 | 12.2 |
| Salt | 0.75 | 0.65 |
| Baking Powder | 0.75 | 0.65 |
| Totals | 114.50 | 100.00 |

*Fig. 3 summarized*

|  | Parts by Weight (including moisture) | Percent |
|---|---|---|
| Wheat Flour | 25.0 | 21.4 |
| Sugar | 20.0 | 17.2 |
| Dry Egg Albumin | 15.0 | 12.9 |
| Dehydrated Whole Eggs | 15.0 | 12.9 |
| Shortening | 21.5 | 18.4 |
| Shell Eggs | 18.0 | 15.4 |
| Salt | 1.0 | 0.86 |
| Baking Powder | 1.0 | 0.86 |
| Totals | 116.5 | 99.92 |

The product of Fig. 3 contains more moisture (before baking) than that of Fig. 2, principally because of the larger use of shell eggs. Obviously a larger proportion of shell eggs could be used with a concomitant reduction in the proportion of dehydrated whole eggs, or vice versa.

The survival bar made by the procedure of Fig. 1 is preferred because it is less expensive and easier to make than the forms of Figs. 2 and 3, besides being more palatable to most tastes.

Still another formula requires 50% of white flour, 30% shortening, 10% sugar, 9% proteinaceous matter (as described above) and 1% salt (or 1% salt plus flavoring). Mixing is accomplished as previously described. Obviously this formula does not give as balanced a ration as the bars of Figs. 1, 2 and 3. Fifty percent is the maximum amount of flour that can be used, and the thirty per cent of shortening is critical. Starch, such as cornstarch, may be substituted for any part or all of the flour. A stabilized wheat base, as disclosed in my pending application Ser. No. 290,616, may be substituted for part of the flour in order to produce a compressed cereal bar having the flavor and nutrition of whole wheat. A mixture of 20% of the disclosed stabilized wheat base with 80% white flour is substantially equivalent to whole wheat flour, and such a mixture may be substituted for the white flour of the above formula.

It has been pointed out above that other types of flour, as well as finely ground cornmeal or oatmeal, may be employed in preparing compressed cereal bars in accordance with this invention. In the claims, the term "flour" is used in a broad sense to include not only wheat flour, but also finely ground meal and other starchy ingredients of bread, cake, or other pastries. Sugar and salt are employed in these compressed cereal bars for their nutritional value and in addition for acceptability. In general, it is preferred not to add more than 2% salt. However, it is not intended that use of more than 2% salt be excluded, since it is possible to employ more than this proportion of salt for nutritional purposes. In general, not more than 0.25% flavoring is needed for acceptability. However, it is contemplated that under some conditions higher proportions of flavoring may be employed.

The most important aspect of the described invention is believed to be the method of mixing, which produces a streusel texture which, upon baking, holds a larger proportion of fat or shortening in the baked product than is possible by any other known process. The described survival bars have high nutritional value and high calorific content, each being a well-balanced mixture of fat, carbohydrate and protein.

I am aware of the Musher Patent No. 2,170,155 for an edible pressed brick or block composed of 17.5 parts fat, 30 parts farina, 6 parts powdered milk (or cream) and 0.7 part salt; this patent teaches a ratio of fat to flour considerably less than 1:1, and therefore falls outside the scope and spirit of the principal aspect of my invention which is concerned with a fat-rich food composition whose preferred forms contain more fat than flour. Although I have illustrated and described the preferred forms of my invention, it will be obvious that various changes may be made therein without departing from the spirit of the invention or from the scope of the subjoined claims. I claim:

1. A homogeneous bar rich in fat and useful for an emergency ration and characterized by its permanent freedom from the presence of fat particles and globules on its exterior; said bar essentially comprising a compressed, baked mixture of from about 10 to about 23 percent of sugar; from about 18 to about 50 per cent of shortening; from about 9 to about 50 per cent of proteinaceous material selected from the group consisting of dry egg albumin, whole eggs, dehydrated whole eggs and egg white; from about 0.65 to about 2.25 per cent of salt and flavoring; and the remainder of said mixture being flour in a proportion of at least about 13 per cent of said mixture and less than the amount of said shortening; all percentage parts being by weight and being inclusive of moisture normally present.

2. A compressed homogeneous bar rich in fat and useful for an emergency ration and characterized by its permanent freedom from the presence of fat particles and globules on its exterior, said bar being a baked mixture of flour about 17 parts, sugar about 25 parts, dry egg albumin about 30 parts, shortening about 30 parts, egg white about 12 parts and salt and flavoring about 1 part; all parts being by weight and being inclusive of moisture normally present.

3. A compressed homogeneous bar rich in fat and useful for an emergency ration and characterized by its permanent freedom from the presence of fat particles and globules on its exterior, said bar being a baked mixture of flour about 15 parts, sugar about 26 parts, dry egg albumin about 28 parts, shortening about 30 parts, whole eggs about 14 parts, salt about 0.75 part, and baking powder about 0.75 part; all parts being by weight and being inclusive of moisture normally present.

4. A method of making survival bars rich in fat but permanently free from fat particles and globules on its exterior, said method comprising mixing flour, dry proteinaceous matter derived from eggs, and sugar until uniformly blended; then adding shortening in liquid form and in an amount exceeding the amount of said flour, and continuing mixing until the blending is completed; making a second blend of proteinaceous matter derived from eggs and salt and flavoring; adding the second blend to the first blend and continuing mixing until a uniform granulation is obtained; baking the product so obtained; and finally compressing the baked product in bars at high pressure.

5. The method claimed in claim 4, wherein the sugar is from about 10 to about 23 per cent, the shortening is from about 18 to about 40 percent, the proteinaceous matter is from about 9 to about 50 per cent, the salt and flavoring is from about 0.65 to about 2.25 per cent, and the flour is at least about 13 per cent but less than the amount of said shortening; all percentage parts being by weight and being inclusive of moisture normally present.

6. The method of claim 4, wherein the pressure of said final compression step is from about 1500 to about 3000 pounds per square inch.

References Cited in the file of this patent
UNITED STATES PATENTS

| | | |
|---|---|---|
| 2,170,155 | Musher | Aug. 22, 1939 |
| 2,176,086 | Logan | Oct. 17, 1939 |
| 2,278,466 | Musher | Apr. 7, 1942 |
| 2,437,150 | Berg | Mar. 2, 1948 |
| 2,520,954 | North et al. | Sept. 5, 1950 |